(12) United States Patent
Nguyen et al.

(10) Patent No.: US 6,550,509 B1
(45) Date of Patent: Apr. 22, 2003

(54) TREAD AND SIDEWALL CONSTRUCTION FOR RUNFLAT TIRE

(75) Inventors: Gia Van Nguyen, Rossignol (BE); Roland Close, Burg-Reuland (BE); Agnes Nathalie Iwana Verbeke-Ensch, Arlon (BE); Georges Marcel Victor Thielen, Schouweiler (LU)

(73) Assignee: The Goodyear Rubber & Tire Company, Akron, OH (US)

( * ) Notice: Subject to any disclaimer, the term of this patent is extended or adjusted under 35 U.S.C. 154(b) by 0 days.

(21) Appl. No.: 09/719,924
(22) PCT Filed: Jun. 19, 1998
(86) PCT No.: PCT/US98/12909
§ 371 (c)(1), (2), (4) Date: Dec. 14, 2000
(87) PCT Pub. No.: WO99/65711
PCT Pub. Date: Dec. 23, 1999

(51) Int. Cl.[7] .......................... B60C 9/00; B60C 11/03; B60C 101/00
(52) U.S. Cl. .......................... 152/209.14; 152/209.16; 152/517; 152/555
(58) Field of Search ................ 152/209.14, 209.16, 152/209.18, 209.27, 517, 555, 523

(56) References Cited

U.S. PATENT DOCUMENTS

| | | | |
|---|---|---|---|
| 3,498,354 A | * | 3/1970 | Boileau |
| 3,782,438 A | * | 1/1974 | Mirtain |
| 3,976,115 A | * | 8/1976 | Mirtain et al. |
| 4,067,374 A | * | 1/1978 | Alden et al. |
| 4,111,249 A | | 9/1978 | Markow |
| 4,957,149 A | * | 9/1990 | Iuchi |
| 5,222,537 A | * | 6/1993 | Saito et al. |
| 5,368,082 A | | 11/1994 | Oare et al. |
| 6,408,909 B1 | * | 6/2002 | Nguyen |

FOREIGN PATENT DOCUMENTS

| | | | |
|---|---|---|---|
| DE | 3307960 | * | 9/1984 |
| DE | 197 15 866 | | 10/1998 |
| EP | 0424155 | | 4/1991 |
| FR | 2128232 | | 10/1972 |
| FR | 2287350 | | 5/1976 |
| GB | 1546593 | * | 5/1979 |
| GB | 2027649 | | 2/1980 |
| WO | WO99/36278 | | 7/1999 |

* cited by examiner

*Primary Examiner*—Steven D. Maki
(74) *Attorney, Agent, or Firm*—Howard M. Cohn

(57) ABSTRACT

A radial ply runflat tire (50) having a tread (52), a carcass (60) with two sidewalls (77,78), one or more radial plies (70,72), two annular beads (36a',36b'), and a belt structure (56) located radially between the tread and the radial ply structure (58). The tread has laterally disposed tread ribs (64a,64b) whose contours are defined by circular curves intersecting nontangentially with the circular curve that defines the contour of the central portion of the tread. Each sidewall portion (77,78) has a rib (63a,63b) that is out of contact with the road during normal inflation operation and that engages the road during runflat operation. The tread ribs (64a,64b) are separated from the respective sidewall ribs (63a,63b) by decoupling grooves (65a,65b) which overlie the point of nontangential intersection of the circular curves that define the respective contours of the sidewall ribs and the laterally disposed tread ribs. Decoupling grooves (66a, 66b) overlie the point of nontangential intersection of the circular curves that define the respective contours of the laterally disposed tread ribs (64a,64b) and the central portion (54) of the tread.

19 Claims, 6 Drawing Sheets

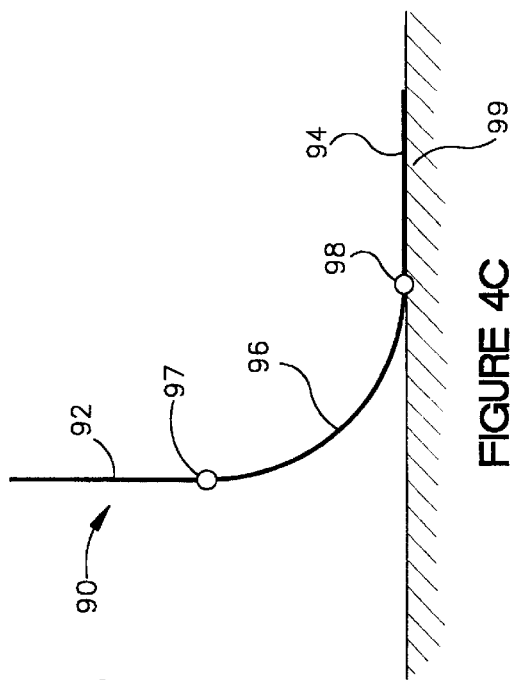
FIGURE 4A
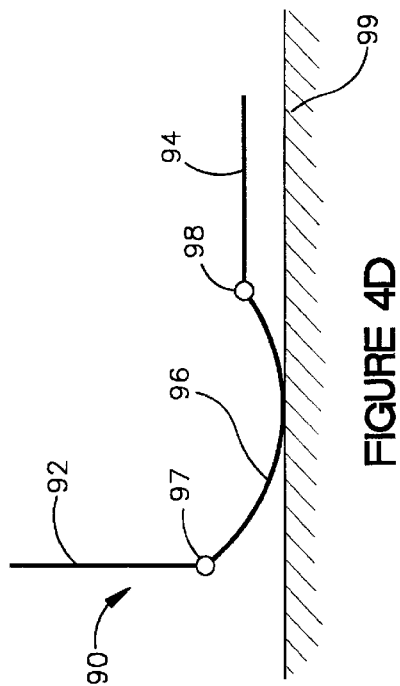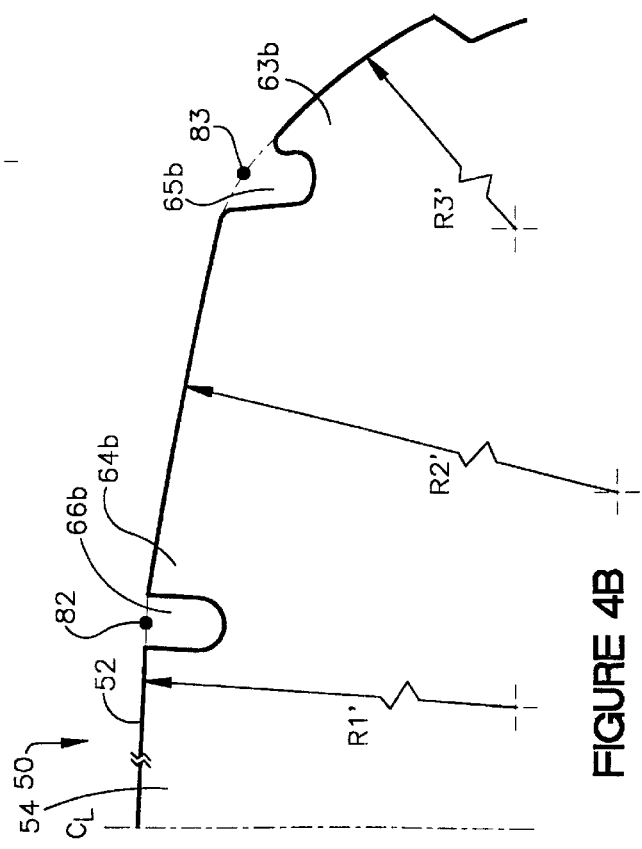
FIGURE 4C
FIGURE 4D
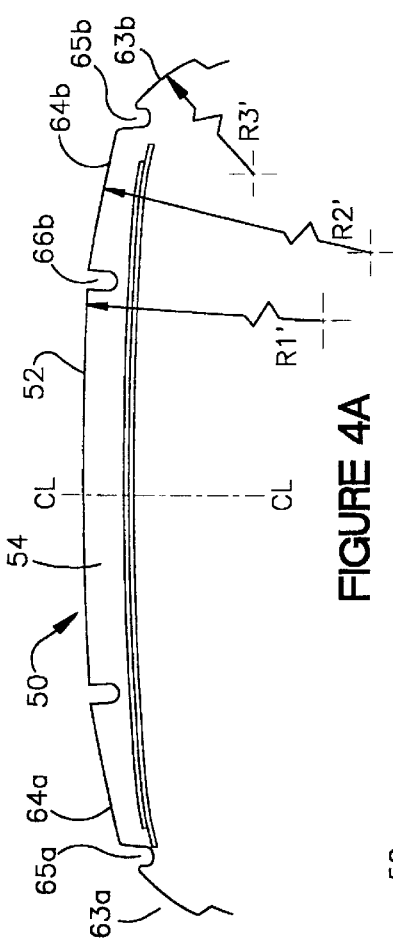
FIGURE 4B

TREAD AND SIDEWALL CONSTRUCTION FOR RUNFLAT TIRE

TECHNICAL FIELD

The present invention relates to pneumatic radial ply runflat passenger tires and to management of tread lift and vehicle handling during runflat operation.

BACKGROUND OF THE INVENTION

Various methods have been devised for enabling the safe continued operation of unpressurized or underpressurized vehicle tires with the intent of minimizing further damage to the uninflated tire and without simultaneously compromising vehicle handling over a distance from the place where the tire has lost its pressure to a place desired by the driver, such as a service station, where the tire can be changed. Loss of tire pressure can result from a variety of causes, including puncture by a foreign object such as a nail or other sharp object piercing the pneumatic tire installed on a vehicle.

Pneumatic tires designed for sustained operation under conditions of unpressurization or underpressurization are also called runflat tires, as they are capable of being driven in the uninflated, or what would generally be called "flat", condition. The conventional pneumatic tire collapses upon itself when it is uninflated and is carrying the weight of a vehicle. The tire's sidewalls buckle outward in the circumferential portion of the tire where the tread contacts the ground, making the tire "flat."

The term "runflat" is generally used to describe a tire that is designed in such a way that the tire structure alone has sufficient rigidity and strength to support the vehicle load when the tire is operated in the uninflated condition. The sidewalls and internal surfaces of the tire do not collapse or buckle onto themselves, and the tire does not otherwise contain or use other supporting structures or other devices to prevent the tire from collapsing.

An example of a runflat tire design is described in U.S. Pat. No. 4,111,249, entitled the "Banded Tire," in which a hoop or annular band approximately as wide as the tread is circumferentially deployed beneath the tread. The hoop in combination with the rest of the tire structure could support the vehicle weight in the uninflated condition.

Numerous methods have been used to achieve workable runflat tire designs. Generally, such tires incorporate sidewall designs that are thicker and/or stiffer, so that the tire's load can be carried by an uninflated tire with minimum adverse effects upon the tire itself and upon vehicle handling until such reasonable time as the tire can be repaired or replaced. The methods used in sidewall stiffening include the incorporation of circumferentially disposed inserts in the inner peripheral surface of the sidewall portion of the carcass, which is the region in the tire usually having the lowest resistance to deformation under vertical loading. In such runflat tire designs, the sidewalls are thickened in a way that each is approximately uniformly thick in the sidewall region between the bead and the tire shoulder.

The reinforced sidewalls of such tires, when operated in the uninflated condition, experience a net compressive load. However, the outer portions of the reinforced sidewalls are in tension due to bending forces which deflect the sidewalls outward or apart from one another in the regions of the sidewall that are adjacent to the ground-contacting portion of the tread. The inner portions of such reinforced sidewalls, in the region near where the tread contacts the ground, tend to be in compression during runflat operation.

A Goodyear U.S. Pat. No. 5,368,082 ('082) disclosed a low aspect ratio runflat pneumatic radial ply tire which employs special sidewall inserts to improve stiffness. Approximately six additional pounds of weight per tire was required to support an 800 lb load in this uninflated tire. This earlier invention, although superior to prior attempts at runflat tire design, still imposed a weight penalty that could be offset by the elimination of a spare tire and the tire jack. However, this weight penalty was even more problematic when the tire designers attempted to build high-aspect-ratio tires for large luxury touring sedans. These taller sidewalled tires, having aspect ratios in the 55% to 65% range or greater, produces correspondingly greater sidewall bending stresses than were encountered in the earlier low-aspect-ratio runflat tires disclosed in the '082 patent. Thus the sidewalls of high profile tires had to be stiffened to the point of compromising ride characteristics. Luxury vehicle owners generally do not wish to sacrifice ride quality for runflat capability. The design requirements for runflat tire design require that there be no loss in ride quality or handling performance. In the very stiff suspension performance type vehicle, such as sport cars and various sport/utility vehicles, the ability to provide such runflat tires is relatively straightforward compared to providing similar runflat tires for luxury sedans which require softer ride characteristics. Light trucks and sport utility vehicles, although not as sensitive to ride performance, provide a runflat tire market that ranges from accepting a stiffer ride to demanding the softer luxury type ride.

In general, runflat tire design is based on the installation of one or more inserts inside each sidewall flex area. The inserts in each sidewall, in combination with the plies, add rigidity to the sidewalls in the reduction or absence of air pressure during runflat operation. While the high resistance to compression deflection of the inserts provides the necessary resistance to the collapse of the uninflated loaded tire, this method has several drawbacks which include the above mentioned increase in tire weight as well as, during runflat operation, changes in the tread-to-road contact, which adversely affect vehicle handling, especially during high-speed runflat operation.

The changes in the tread-to-road contact during runflat operation derive from the tendency of the thick reinforced sidewalls to transmit bending forces to the portion of the tread that contacts the ground. The result is that the central portion of the tread tends to buckle upwards from the ground. The upward buckle reduces the ground contact in the tread's central region, resulting in compromised vehicle handling as well as reduced runflat tread life due to severe cyclical flexure, and corresponding heat buildup, of the central portions of the tread, especially during sustained high-speed operation.

Clearly, the goal in runflat tire design is to provide a tire which gives good runflat vehicle handling as well as good service life of the tire during runflat operation. Since the handling deficit associated with runflat operation derives at least partially upward buckling of the central portion of the tire tread, various methods have been introduced to minimize such buckling or "tread lift," as it is sometimes called. Such methods include means by which to increase the lateral stiffness of the tread by the employment of additional structures, such compressive-stress-bearing breaker reinforcements, tensile-stress-bearing ply reinforcements, and wedge inserts located between the breakers and plies. (The latter wedge inserts give mechanical advantage to the respective tension-bearing and compression-bearing structures). The main disadvantage of such tread-stiffening structural additions is greater tire weight, in addition to the increased weight of the reinforced sidewalls.

Another aspect of the tire design that effects runflat operation relates to the tread contour. Treads designed specifically for the passenger vehicles traditionally have been designed such that the cross-sectional, or translateral, contour of the tread has been defined according to multiple radii of curvature which are joined in such a way that adjacent circular curves meet one another tangentially, i.e., without discontinuity in the curvature of the tread across its lateral dimension. Furthermore, the radius of curvature defining the cross-sectional contour of the central portions of the tread tends to be much longer than the radii of curvature that define the cross-sectional contour of the tread in the shoulder regions.

An alternative tread contour is one in which the translateral contour is defined by circular curves that do not join tangentially, i.e., the tread contour is defined by adjacent circular curves which intersect nontangentially. An example of such a tread design is taught in patent application Ser. No. PCT/US98/00717 entitled PASSENGER TIRE WITH IMPROVED TREAD CONTOUR WITH DECOUPLING GROOVES having a common assignee with the present invention and is incorporated in its entirety by reference hereto. The tread contour described in patent application Ser. No. PCT/US98/00717 is one in which nontangential, i.e., discontinuous, circular curves define the translateral contour of the tread in such a way that the lateral-most portions of the tread shoulders are "dropped," or angled radially inward, such that the central portion of the tread becomes more heavily loaded than the shoulder portions of the tread during both normal inflated operation and during runflat operation. Thus one objective of the tread contour described in patent application Ser. No.PCT/US98/00717 was to achieve an improved tread footprint in tires incorporating at least one carcass ply in which the reinforcing cords are of high-modulus material. High-modulus carcass plies, especially in combination with the insert reinforced sidewall structures that are characteristic of current runflat tire designs, are more readily able to transmit bending forces, or torques, during runflat operation, from the sidewalls to the tread. A result of such transmitted bending forces is, as described above, a tendency of the center portions of the tread to buckle upward, i.e., to undergo the kind of "tread lift" during runflat operation which leads to compromised runflat vehicle handling.

More specifically, in the particular case of runflat type tires having thick sidewalls, if the tread shoulder contours are described by tangentially joined adjacent curves having smaller radii of curvature in the regions of the tread shoulders, bending forces tend more readily to be transmitted from the sidewalls to the tread during conditions of low to zero air pressure in the tire. One result of this upward buckling of the tread during runflat conditions is the potential for loss of vehicle handling in straight-run operation and, especially, in cornering; oversteering is particularly problematic when the uninflated runflat tire is located on a rear axle.

Additional difficulties associated with runflat tire designs having cross-sectional tread contours defined by mutually tangential circular curves is shorter operational life of the tread in the runflat condition, due to the cycling of severe upward bending stresses in the tread center. Yet another result associated with runflat operation is the tendency for the shoulders of the tire to come into contact with the road, causing yet further difficulties in handling in straight line operation and especially in cornering.

The disadvantages of tread contours defined by tangentially intersecting adjacent circular curves described in the paragraph above in relation to runflat tires apply generally to all tires that have cross-sectional tread contours which are defined by tangentially adjacent circular curves.

However, the development of tires having high-modulus carcass plies, in particular plies that are reinforced with inextensible metal cords, leads to treads that tend not to flatten in a way that optimally distributes the loading on the ground; more specifically, a high-modulus carcass having low radii of curvature tread contour in the shoulder region tends to cause the tire's load to be disproportionately borne by the shoulders and sides of the tread, with the central portions of the tread being under little or no load under runflat conditions. This leads to poor footprint pressure distribution in straight driving and to low footprint contact surface in cornering.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat radial tire whose tread is isolated from sidewall bending forces that tend to lift the central portions of the tread away from the ground during runflat operation.

Another object of the present invention is to provide a runflat radial tire having a radially outermost sidewall that includes a rib which makes contact with the road during runflat operation, thereby increasing the effective width of the tread and maintaining good high-speed vehicle handling in the runflat mode.

Another object of the present invention is to provide a runflat radial tire having a cross-sectional tread contour that facilitates the uniform flattening of the entire tread width upon the road during runflat operation.

Yet another object of the present invention is to provide a runflat radial tire incorporating decoupling grooves axially inward of each lateral-most tread rib and in each crown shoulder so as to minimize the transmission of bending forces that originate in the sidewalls during runflat operation and which tend to lift the central portions of the tread out of contact with the road.

Still another object of the present invention is to apply the inventive concept to a variety of alternative carcass constructions.

SUMMARY OF THE INVENTION

The present invention relates to a pneumatic radial ply runflat tire having a tread, a carcass comprising a radial ply structure having at least one radial ply, a belt structure located between the tread and the radial ply structure, two sidewalls reinforced by one or more inserts, and a tread contour of which the laterally disposed tread ribs are defined by circular curves having large radii of curvature. The outermost ply, or the single ply, is reinforced with inextensible metal cords. The sidewalls each have a rib near the radially outermost regions. The circular curves that define the cross-sectional contour of the central portions of the tread and the laterally disposed tread rib intersect nontangentially. A circumferentially disposed decoupling groove underlies each respective nontangential locus of points of nontangential intersection of the circular curves that define the cross-sectional contour of the tread. The circular curve defining the contour of each radially outward-most sidewall rib intersects nontantentially with the circular curve that defines the contour of each laterally disposed tread rib. A second set of decoupling grooves is disposed such that one groove is located circumferentially in each shoulder region where the contour-defining curves intersect nontangentially between each radially disposed sidewall rib and the adjacent laterally disposed tread rib. The lateral-most decoupling grooves between the laterally disposed tread rib and the sidewall rib are circumferential and continuous, or they are circumferential and non-continuous. The decoupling grooves between the laterally disposed tread rib and the central portions of the tread are circumferential and straight in design, or they are have a zig-zagged pattern.

The preferred embodiment of the invention is a pneumatic runflat radial tire having a low-aspect-ratio (in the range of about 30% to about 60%) design. This embodiment has potential for runflat use in high-performance sports type vehicles or light trucks. The inventive features of this low-aspect-ratio, radial ply runflat pneumatic tire provide for runflat operation in which runflat tread lift is minimized, and the tread footprint is widened during runflat operation.

BRIEF DESCRIPTION OF THE DRAWINGS

The structure, operation, and advantages of the invention will become further apparent upon consideration of the following description taken in conjunction with the accompanying drawings, wherein:

FIG. 4A is a cross-sectional schematic view of the tread contour as defined by adjacent circular curves;

FIG. 4B is an enlarged portion of the cross-sectional schematic diagram of FIG. 4A;

FIG. 4C is a simplified mechanical schematic diagram of the shoulder region of a fully inflated prior art tire;

FIG. 4D is a simplified mechanical schematic diagram of the shoulder region of the prior art tire of FIG. 4C, in an uninflated condition;

DEFINITIONS

Figure 1:
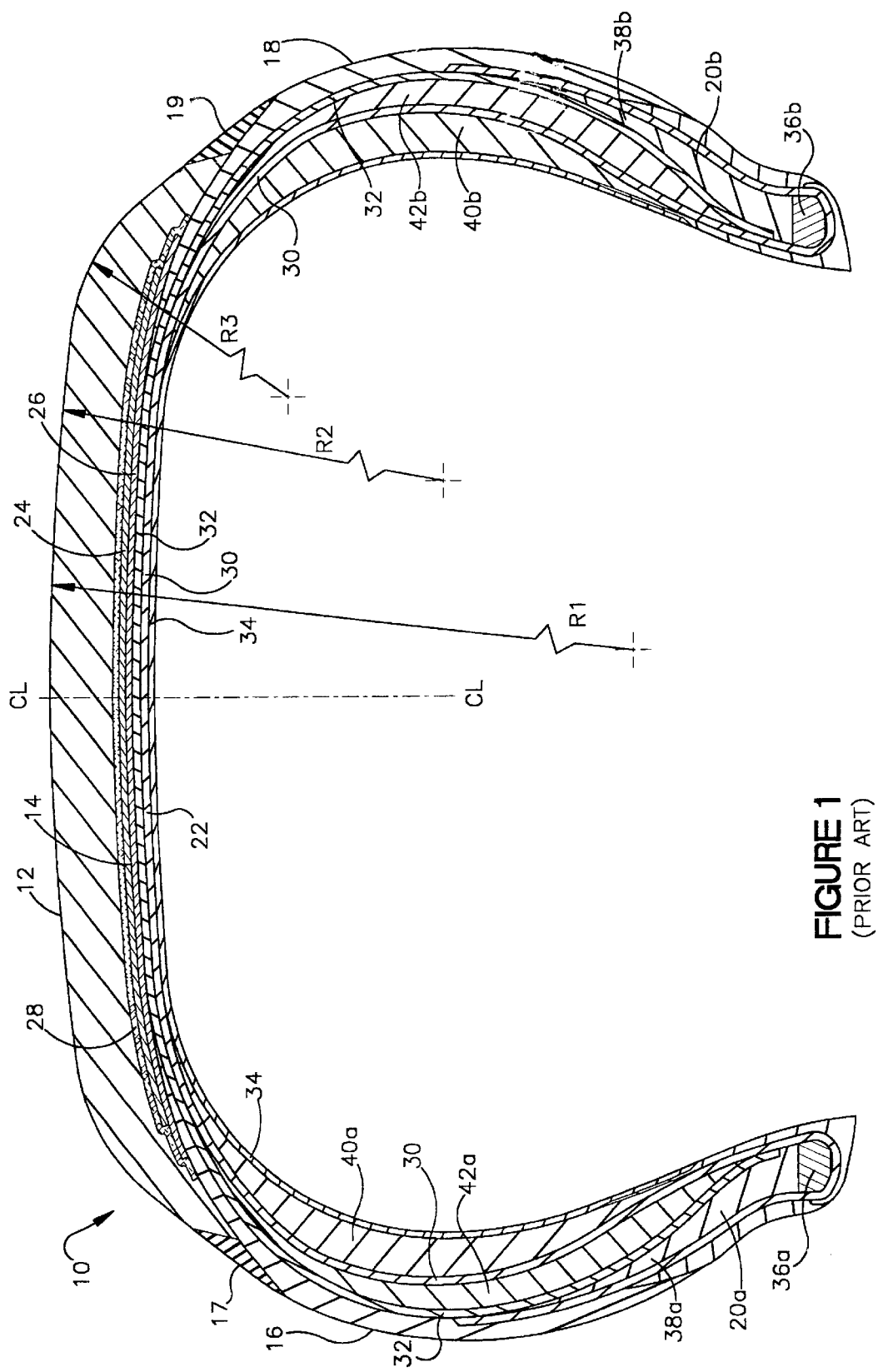
FIG. 1 is a cross-sectional view of a prior art runflat tire design incorporating insert-reinforced sidewalls and built according to tread-over-sidewall (TOS) method of construction.

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from about 18° to about 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Decoupling Groove" means a circumferentially deployed groove in the lateral regions of the tread or in the shoulder regions, such grooves operating to minimize the transmission of bending forces from the sidewalls to the tread during runflat operation.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface.

"Inner Liner" means the layer or layers of elastomer or other material that form the inside surface of a tubeless tire and that contain the inflating gas or fluid within the tire.

"Insert" means the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Normal Inflation Pressure" means the specific design inflation pressure at a specified load assigned by the appropriate standards organization for the service condition for the tire.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between about 65° and 90° with respect to the equatorial plane of the tire.

"Radial Ply Tire" means a belted or circumferentially-restricted pneumatic tire in which at least one ply has cords which extend from bead to bead are laid at cord angles between about 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Sidewall-over-tread," or SOT, refers to a tire design and method of fabrication in which the radially outermost portions of each sidewall of a tire overly the lateral-most portions of the tread.

"SOT" see "sidewall-over-tread."

"Tangential" and "Tangentially" refer to segments of circular curves that intersect at a point through which can be drawn a single line that is mutually tangential to both circular segments.

"Tread Contour" means the shape of a tire tread as viewed in axial cross section.

"Tread-over-sidewall," or TOS, refers to a tire design and method of fabrication in which the lateral-most portions of the tread overly radially outermost portions of each sidewall of a tire.

"Tread width" means the arc length of the tread surface in the plane that includes the axis of rotation of the tire.

"TOS" see "tread over sidewall."

"Wedge Insert" means the same as "Insert."

DETAILED DESCRIPTION OF THE PREFERRED EMBODIMENT

Prior Art Embodiment

With reference to FIG. 1, a cross section of a typical prior art pneumatic radial runflat tire 10 is illustrated. The tire 10 has a tread 12, a belt structure 14, a pair of sidewall portions 16,18, a pair of bead regions 20a,20b and a carcass structure 22. Belt structure 14 comprises two belts 24,26. The carcass 22 comprises a first ply 30 and second ply 32, a gas-impervious inner liner 34, a pair of beads 36a,36b, a pair of bead filler apexes 38a,38b, a first pair of sidewall wedge inserts 40a,40b, and a second pair of sidewall wedge inserts 42a,42b. The first or innermost wedge insert 40a,40b is located between the inner liner 34 and the first ply 30, and the second wedge insert 42a, 42b is located between the first ply 30 and second ply 32. A fabric overlay 28 is disposed beneath, or radially inward of, tread 12 and on top of, or radially outward from, belt structure 14. The reinforced sidewall portions 16,18 of carcass structure 22 give the tire 10 a limited runflat capability.

As can be seen from FIG. 1, the structural reinforcement in the sidewall area of the tire 10 substantially increases the overall thickness of the sidewall portions 16,18. This generalized prior art runflat tire design shows the more or less uniformly thickened sidewalls that characterize runflat tire designs. The wedge-insert-reinforced sidewalls are necessary to support the tire's load with minimal sidewall deflection when the tire 10 is in an uninflated state. Such runflat tire designs provide good vehicle handling and performance under conditions of full inflation, and they provide acceptable runflat vehicle handling and runflat operational life when the tire is uninflated. Runflat tires generally weigh more than equivalent non-runflat-capable tires because of the additional weight of the reinforcement material in the sidewalls; this additional weight is greater in high-profile runflat tires than in low-profile runflat tires.

Figure 2A:
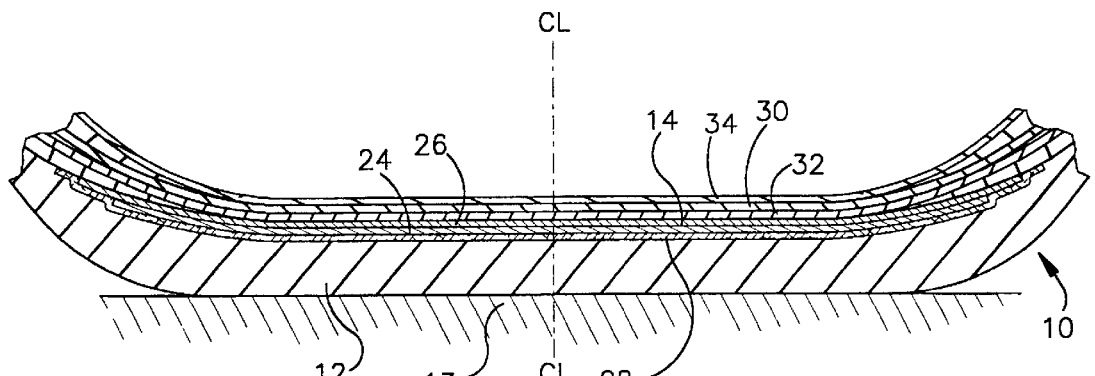
FIG. 2A is a fragmentary cross-sectional schematic view of the ground-contacting portion of the prior art runflat tire of FIG. 1 in normally inflated condition.

FIG. 2A shows a fragmentary schematic of a normally inflated prior art tire 10 with its tread 12 fully in contact, across its entire width, with the ground 13. The flattening of the tread 12, in the region where it contacts the ground 13, induces bending stresses in the tread and its underlying components, including belt structure 14, fabric overlay 28, belts 24,26, radial plies 30,32, and inner liner 34. More specifically, the bending stresses derive from the flattening of the tread 12 from the as-molded and/or the as-inflated lateral curvature of tread and its underlying structures. These bending stresses induce tensile stresses in the radially inward structures beneath tread 12, such as the inner liner 34 and the radial plies 30,32. Corresponding compressive stresses are induced in the elastomeric material of tread 12 and such underlying structures as the fabric overlay 28 and portions of the belt structure 14.

Figure 2B:
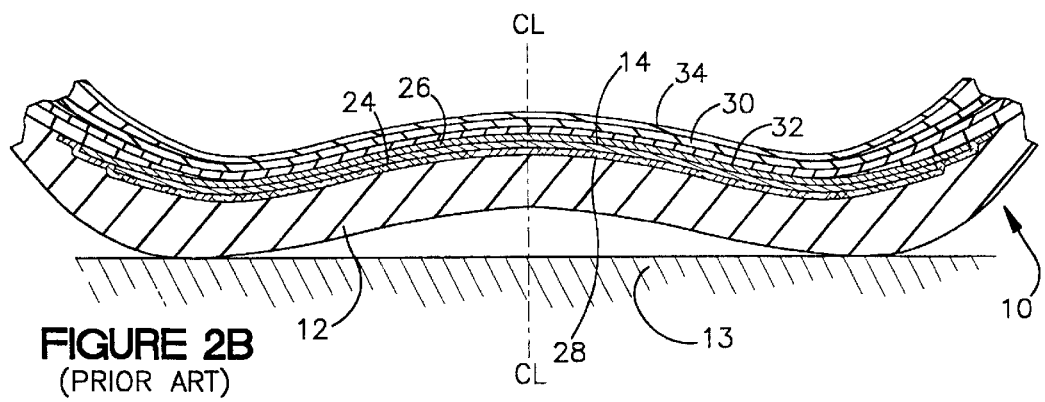
FIG. 2B is a fragmentary cross-sectional schematic view of the ground-contacting portion of the prior art runflat tire of FIG. 1 in an uninflated condition.

FIG. 2B illustrates the upward buckling of the central portion of tread 12 of the prior art runflat tire 10 when it is operated in an uninflated state. The upward buckling, or tread lift, is maximum in the central region where the load-bearing tread would otherwise contact the flat road surface 13. The upward buckling of the central tread region derives from torque forces which originate in the reinforced and thickened sidewalls 16,18 (FIG. 1) when they deform under the vehicle's load during runflat operation. The respective tensile and compression stresses experienced by the tread 12 during runflat operation, as illustrated in FIG. 2B, greatly exceed those associated with simple flattening of the tread during normal-inflated operation, as illustrated in FIG. 2A.

A point worth noting in relation to prior art tire 10 shown in FIG. 1 is that it is built according to tread-over-sidewall (TOS) construction. However, for the purposes of describing this invention, the prior art runflat tire illustrated in FIG. 1 could as well be of sidewall-over-tread (SOT) construction, or some intermediate style of design as, for example, the one taught in U.S. patent application Ser. No. 09/049,409 entitled IMPROVED TIRE TREAD AND SIDEWALL CONSTRUCTION, having a common assignee with the present invention.

Brief Summary of the Inventive Concept and Its Operation

Figure 3:
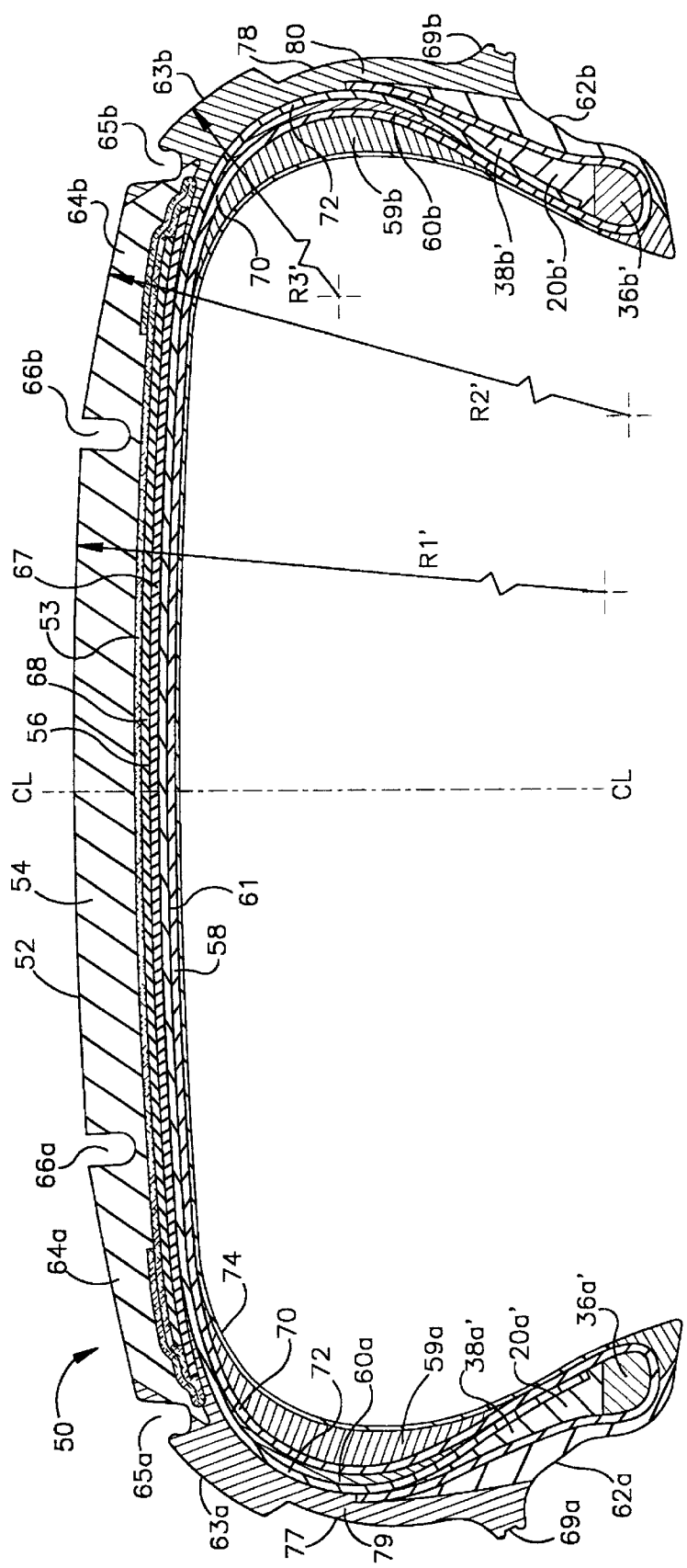
FIG. 3 shows one arrangement of the inventive features of the present invention.

FIG. 3 shows a runflat tire 50 according to the present invention. The tire 50 has the same general sidewall features as that of the prior art runflat tire 10 shown in FIG. 1. In FIG. 3 and elsewhere in the specification, primed and double primed numbers represent structural elements which are substantially identical to structural elements represented by the same unprimed number referred to elsewhere.

In FIG. 3, the tire 50 has a tread 52, a belt structure 56, a pair of sidewall portions 77,78, a pair of bead regions 20a',20b' and a carcass structure 61. Belt structure 56 comprises two belts 67,68. The carcass 61 comprises a first ply 70 and second ply 72, a gas-impervious inner liner 74, a pair of beads 36a',36b', a pair of bead filler apexes 38a',38b', a first pair of sidewall wedge inserts 59a,59b, and a second pair of sidewall wedge inserts 60a,60b. The first or innermost wedge insert 59a,59b is located between the inner liner 74 and the first ply 70, and the second wedge insert 60a,60b is located between the first ply 70 and second ply 72. Fabric overlay 53 is disposed beneath, or radially inward of, tread 52 and on top of, or radially outward from, belt structure 56. The reinforced sidewall portions 77,78 depicted in the tire 50 in FIG. 3 include the chafers 62a,62b and the molded elastomeric sidewall structures 79,80.

The elements of the invention include the sidewall structures 79,80 (which include sidewall ribs 63a,63b and rim flange protectors 69a,69b), decoupling grooves 65a,65b, and the cross-sectional contour of the central portion 54 of tread 52 and the laterally disposed tread ribs 64a,64b. Decoupling grooves 66a,66b are also part of the invention.

The operational relationship with the sidewall structures and other structures of tire 50 are described below within the dynamical context of both normally inflated and uninflated runflat operation. The innovative features of the invention will become evident in the treatment which follows wherein the elements of the invention are discussed separately and then in operational relation to one another. The operation of the inventive concept is then described in relation to the prior art.

In brief summary, the operation of the inventive features of the tire 50 depicted in FIG. 3 is such that the central portion 54 of the tread 52, during runflat operation, resists upward buckling of its central portions by means of the combined effects of the tread's cross-sectional contour (as defined by circular curves, to be described), the decoupling grooves 65a,65b and 66a,66b, sidewall ribs 63a,63b and laterally disposed tread ribs 64a,64b. During runflat operation, the decoupling grooves 65a,65b impede the transmission of torque forces from the load-bearing sidewall portions 77,78, respectively, to the tread 52, thereby inhibiting lifting of the central portion 54 of the tread. In addition, the contour of tread 52 (as described in detail below) is such that during runflat operation the outermost tread ribs 64a, 64b assume more of the tire's load than during normal inflated operation; and decoupling grooves 66a,66b also impede the transmission of lifting forces meridionally toward the center of the tread. Furthermore, sidewall ribs 63a,63b come into contact with the road during runflat operation, thereby increasing the tread's effective operational width beyond that of normal inflated operation and thus enhancing the vehicle's runflat handling. The improved runflat handling is thus achieved without recourse to the addition of structural reinforcements within the crown region of tire 50 and without the weight penalties associated with having such structural reinforcements within the tire's crown region.

Tread Contour

The cross-sectional contour of tread 12 of prior art tire 10 in FIG. 1 is defined by sets of adjacent and tangentially intersecting circular curves which are part of the mold cavity in which the tire is molded and vulcanized. The tangentiality of adjacent contour defining curves of the prior art tread is such that each set of two adjacent circular curves intersect at a point though which a single line can be drawn that is tangential to both adjacent circular curves, even though the adjacent circular curves are defined by different radii of curvature. More specifically, the prior art tire 10 shown in FIG. 1 is shown with a crown region and tread 12 whose contour is defined by three circular curves having radii of $R_1$, $R_2$, and $R_3$ where $R_1$, which defines the flattest and central-most portion of the tread, is larger than the radius $R_2$, which defines the contour of the intermediate region between the center of the tread and the shoulder and which, in turn, is larger than $R_3$ which defines the lateral most portions, or shoulder portions, of the tread adjacent to the sidewall portions 16,17. (Assuming the respective prior art tire 10 is symmetric about the its centerline CL, then the radii, and centers, of the circular curves that define the tread contour are correspondingly symmetrical with respect to the centerline CL.) The contour-defining radii shown in FIG. 1 are intended to indicate only that multiple adjacent circular curves are used to defined the tread contour, and that the adjacent circular curves intersect tangentially; the number of contour-defining circular curves shown in the FIG. 1 are not intended to imply the use of a specific number of tread-contour defining circular curves.

Referring to FIG. 3, the cross-sectional contour of tread 52 is defined by circular curves that, in contrast to the prior art tires, intersect nontangentially. That is, the central portion 54 of tread 52 is defined by a circular curve having a large radius, $R_1'$, while the contours of the tread's side ribs 64a,64b are defined by $R_2'$, which is comparable in length to $R_1'$. Though shoulder ribs 63a,63b, which are located in the radially outer-most regions of the sidewalls are not part of the tread 52 per se during normal-inflated operation, these ribs do make contact with the road during runflat operation. Furthermore, the contour of the shoulder ribs 63a,63b are defined by a circular curve having a radius $R_3'$, which intersects nontangentially with the adjacent circular curve defined by radius $R_2'$.

FIGS. 4A and 4B are schematic detail illustrations of the geometric relationships of the adjacent contour-defining circular curves having radii $R^{1'}$, $R_2'$ and $R_3'$. FIG. 4B is an enlarged, more detailed view of the nontangential nature of the intersection of the two circular curves defined respectively by radii $R_1'$ and $R_2'$. The point 82 where the circular curves meet nontangentially is located radially outward of tread groove 66b. The nontangentially of the intersection of the two adjacent circular curves is evident in that point 82 cannot contain a straight line (oriented in the plane of the page) that is simultaneously tangent to both respective circular curves; this is in contrast to the -tangential intersection of the adjacent circular curves that define the tread contour in the prior art tire shown in FIG. 1. Similarly in FIG. 4B, the contour of the shoulder rib 63b (as well as 63a, which is not shown), is defined by the circular curve of radius $R_3'$, which intersects with the circular curve defined by the radius $R_2'$ at the point 83 located radially outward of the decoupling groove 65b. In FIG. 4B, if tread groove 66b were not present, the contour of the portion of the tread 64b to the right of point 82 would not join in a smooth, or continuous, way with the adjacent circular curve (having radius $R_1'$) which defines the contour of the central-most portion 54 of tread 52.

One benefit of a tread contour defined by nontangential circular curves having large radii of curvature is that the tread ribs 64a,64b (shown in FIG. 3) are flatter (i.e., have less curvature) than in the corresponding portions of the prior art tire. The benefit of having flatter ribs 64a,64b becomes clearer upon contemplation of FIGS. 4C and 4D, which demonstrate, by means of hinges and linkages, the "rolling" effect of a prior art tire shoulder link 96 defined by a single circular curve having a radius (not shown) equivalent to $R_3$ shown in FIG. 1. More specifically, FIGS. 4C and 4D show the shoulder region of a "tire" 90 comprising a sidewall link 92, a tread link 94, a shoulder link 96, a sidewall-to-shoulder hinge 97, and a tread-to-shoulder hinge 98. The hinges 97,98 in FIGS. 4C and 4D correspond to decoupling grooves of the sort that might be found in prior art tires.

Operational Dynamics of the Invention

FIG. 4C shows the spacial relationships of the "sidewall" 92, "tread" 94, and "shoulder" 96 of an inflated prior art tire 90 in which the shoulder contour is determined according to a circular curve having a radius of curvature comparable to $R_3$ in FIG. 1. FIG. 4D shows the change in spacial relationships when tire 90 is uninflated. In the latter instance, sidewall 92 drops downward, bringing to bear a large portion of the tire's load upon the shoulder link 96 which rocks counterclockwise, lifting tread 94 off the ground.

Figure 5A:
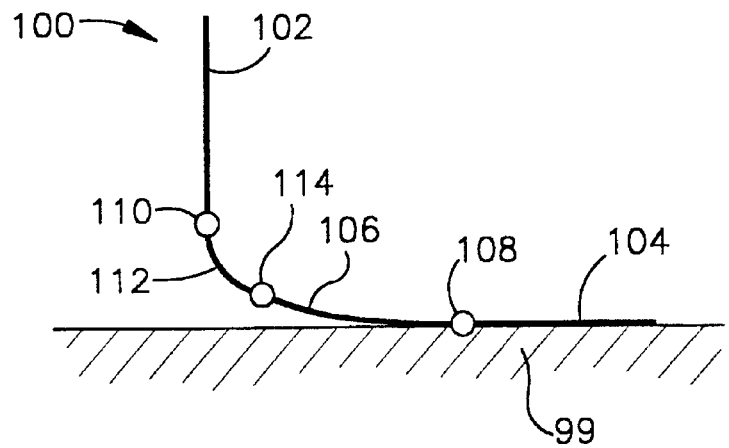
FIG. 5A is a simplified mechanical schematic diagram of the shoulder region of a fully inflated tire according to the present invention.
Figure 5B:
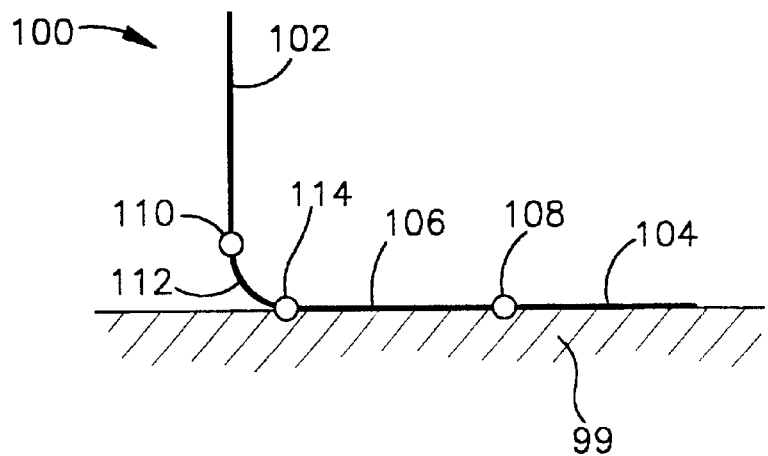
FIG. 5B is a simplified mechanical schematic diagram of the shoulder region of a partially inflated tire according to the present invention.
Figure 5C:
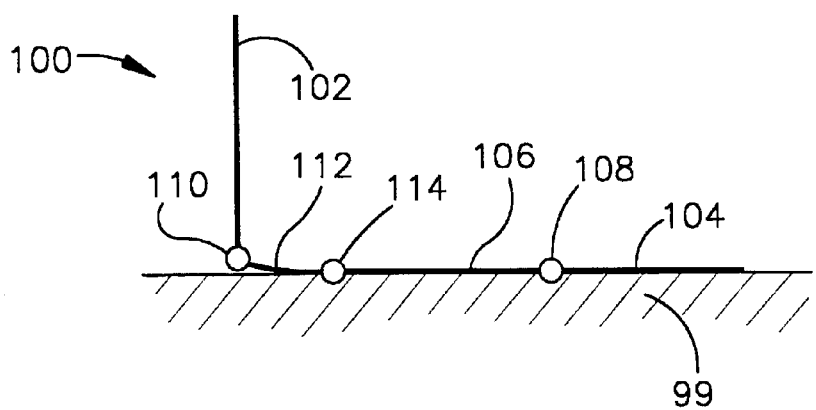
FIG. 5C is a simplified mechanical schematic diagram of the shoulder region of a deflated tire according to the present invention.

By contrast, the operation of the present invention is illustrated in FIGS. 5A, 5B and 5C, which show a schematic system of linkages, similar to those of FIGS. 4C and 4D. FIG. 5A shows a fully inflated "tire" 100 making contact with the road surface 99. The "hinges" and "linkages" in FIGS. 5A, 5B and 5C, correspond to the following components of the present invention, as shown on the right side of the cross-sectional view in FIG. 3. That is, link 102 corresponds to sidewall 80; hinge 110 corresponds to the radially inward most edge of rib 63b where it joins with sidewall 80 (this is a relatively stiff hinge point; the final one to flex as the tire undergoes deflation); curved link 112 corresponds to rib 63b; hinge 114 corresponds to decoupling groove 65b; link 106 corresponds lateral-most tread rib 64b; hinge 108 corresponds to decoupling groove 66b; and link 104 corresponds to the central most portions 54 of tread 52 (i.e., the portions of the tread located between decoupling grooves 66a and 66b).

Referring in sequence to FIGS. 5A, 5B and 5C, as the tire 100 deflates, "hinge" 108 yields first, allowing link 106 to settle upon the road 99 (FIG. 5B, intermediate inflation); as the tire deflates further, "hinge" 114 yields (FIG. 5C, zero inflation), which allows a large portion of curved link 112 to settle onto the road. Notice in the sequence running from FIG. 5A to FIG. 5C that the "sidewall" 102 moves laterally outward, that the central port of the tread, as denoted by 104 does not lift off the ground, and that the width of the tread's effective footprint actually increases, giving an enhanced road contact during runflat operation. Or, from another perspective, the relatively flatter tread ribs 64a,64b (FIGS. 3 and 4A; and the link 108 in FIG. 5A) are more easily able to make full contact with the ground than are the corresponding prior art shoulder ribs described above and illustrated in prior art FIG. 1 and in the schematic FIGS. 4C and 4D. In other words, during runflat operation, the side-most ribs 64a,64b of the present invention deflect only slightly in order to make full contact with the road, and such small angular deflection results in only a minimal transmission of bending forces, and lifting forces, to the central most portions 54 of tread 52, thus minimizing the potential for tread lift during runflat operation. Moreover, during runflat operation, the minimal tread-lifting forces associated with the small angular deflection which accompanies the making of full contact of tread ribs 64a,64b with the road are further mitigated by the torsional decoupling effects of the lateral tread grooves 66a,66b (which offer no corresponding benefit in the case of low radii of curvature "shoulder element" 96 shown for a prior art tire 90 in FIG. 4D).

Sidewall Ribs

Referring to FIG. 3, sidewall regions 77,78 include the respective molded sidewalls 79,80 which comprise sidewall ribs 63a,63b and rim flange protectors 69a,69b. Rim flange protectors 69a,69b operate to maintain the tire upon the wheel rim during runflat operation, while chafers 62a,62b protect the underlying ply structure from abrasion against the wheel rim.

The contours of sidewall ribs 63a,63b are defined by circular curves having radius $R_3'$ (which is not shown for rib 63a). Under normal inflated operation on a straight road, sidewalls ribs 63a,63b make little or no contact with the road surface. However, under runflat operation, when the sidewall regions 77,78 buckle axially outward in the portion of the tire 50 where the tread 52 makes contacts the road, the sidewall deformation causes ribs 63a,63b to undergo a rotation, bringing them into intimate contact with the road. This contact is illustrated schematically in FIG. 5C and diagrammatically in FIG. 6.

Figure 6:
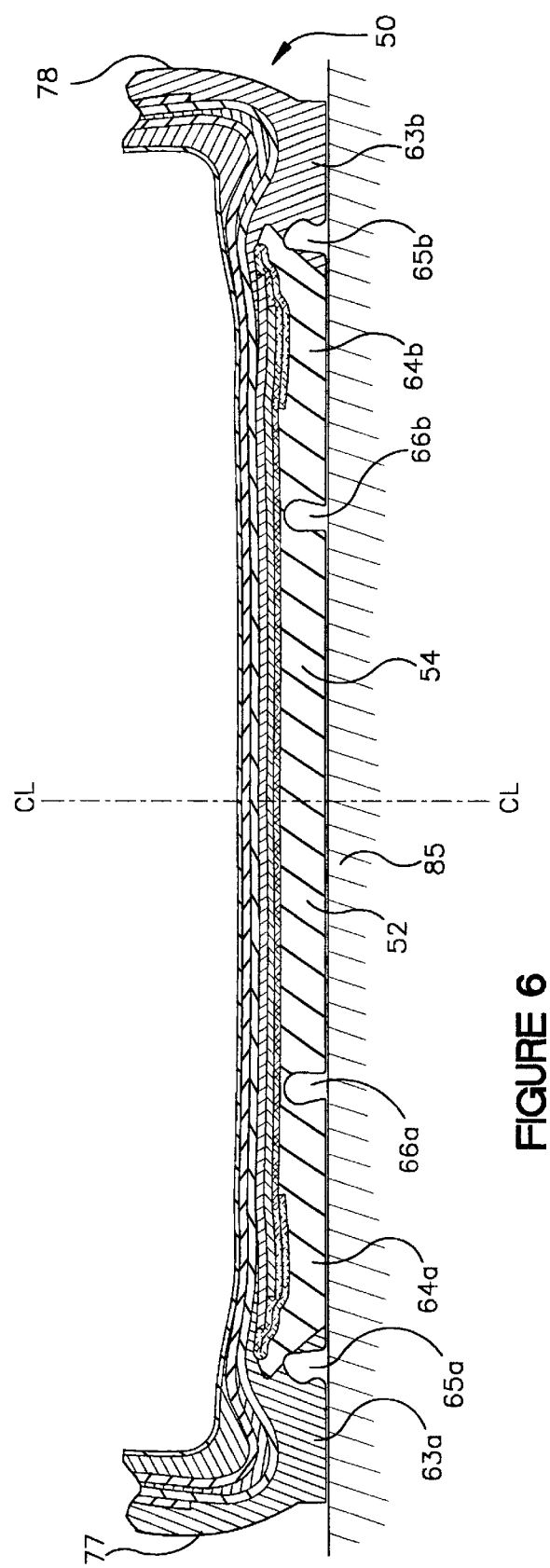
FIG. 6 is a schematic view of the ground-contacting portions of the tire according to the present invention when the tire is in the uninflated condition.

FIG. 6 shows the portion of the tread 52 of tire 50 that contacts the road surface 85 under conditions of zero inflation pressure. Under such conditions, sidewall ribs 63a,63b make road contact, thereby producing a wider tread footprint than when the tire is operated under normal inflation. Such a widened footprint enhances the zero inflation, or runflat, contact between the tread 52 and the road surface 85, thereby enhancing the runflat handling of a vehicle equipped with the tire of this invention.

Decoupling Grooves

Referring to FIG. 3, sidewall regions 77,78 are isolated in terms of transmission of their torsional forces to the tread 52 by means of the lateral-most decoupling grooves 65a,65b and by the decoupling grooves 66a,66b. As the tire 50 undergoes deflation, the decoupling grooves 66a,66b allow the tread ribs 64a,64b to make full road contact while undergoing only a small rotation; as deflation continues, decoupling 65a,65b yield in such a way that ribs 63a,63b come increasingly into contact with the road, as shown in FIG. 6 and, schematically, in FIG. 5C. Thus the two sets of decoupling grooves, 66a,66b and 65a,65b impede the transmission of torsional forces from the outwardly buckled sidewalls 77,78 when the tire 50 is in an uninflated or runflat mode. Incidently, the two sets of decoupling grooves, 66a, 66b and 65a,65b, which are circumferentially oriented respectively on the shoulder and tread, may or may not be continuous or even straight-lined in their circumferential positioning on the tire; i.e., the grooves could be discontinuous, and/or even zig-zagged. Furthermore, the thickness of the portions of the tire structure underlying grooves 65a,65b, including the carcass structure 61 and possibly also the edges of the belt structure 56 and the fabric overlay 53, is in the range of about 20% to about 60% of the total combined thickness of the shoulder region of the tread 52, the fabric overlay, the belt structure and the carcass structure of the tire 50. Preferably the thickness of the portions of the tire structure underlying grooves 65a,65b is in the range of about 30% to about 50% of the aforesaid shoulder portion of the tread and underlying structures.

Operation of Inventive Concept in Relation to the Prior Art

The inventive concept addresses the tread buckling, or tread lift, associated with runflat tires when they are operated in the runflat mode. This invention inhibits the transmission of tread lifting and bending forces, without resorting to various prior art methods used to reinforce the lateral rigidity of the tread and its underlying structure.

This present invention, by incorporating the decoupling grooves 65a,65b in the shoulder region, and decoupling grooves 66a,66b located between the tread ribs 64a,64b and the central-most portion 54 of the tread 52, in conjunction with the large radius of curvature which defines the contour of ribs 64a,64b, the latter joining with the central portion of the tread in a nontangential way, enables the tread of the tire of the present invention actually to increase the amount of tread contact with the road during runflat operation. More specifically, the use of nontangential tread-contour defining circular curves having large radii of curvature enables the lateral-most ribs 64a,64b of tread 52 to assume, without conveying significant bending stresses axially inward toward the center portion 54 of the tread, a larger share of the runflat load. Thus the inventive concepts provide a runflat tire that can maintain a good tread-to-road footprint, one that even increases in effective working width and area during runflat operation, without invoking the weight penalties associated with structural reinforcements across the tread. The net result is a runflat tire having superior runflat handling characteristics as well as improved runflat operational life, especially in the central region 54 of the center of the tread 52 where upward buckling, and corresponding cyclical flexure, are minimized in such a way that heat buildup is minimized.

LOW-ASPECT-RATIO DESIGN

Referring to FIG. 3, there is illustrated an embodiment of the invention within a runflat radial ply tire 50 in low-aspect-ratio design. Such an embodiment would have potential for runflat use in high-performance sports type vehicles or light trucks. This low-aspect-ratio runflat radial ply runflat pneumatic tire 50 contains two belts 67,68, two plies 70,72. The outer ply 72 is reinforced with inextensible metal cords, which stiffen the shoulders of tire 50 in ways which would tend to invoke tread lift during runflat operation were the inventive features not in place to impede tread lift and the resultant vehicle handling deficits.

While the invention has been described in combination with an embodiment thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat tire having a tread, two inextensible annular beads, a carcass comprising a radial ply structure having at least one radial ply, a belt structure located between the tread and the radial ply structure, and two sidewalls reinforced by one or more inserts, the tire being characterized by:
   a tread having a central region and adjacent laterally outermost disposed tread ribs; the central region of the tread defining an outer contour, and each tread rib defining an outer contour;
   a sidewall rib disposed near a radially outermost region of each sidewall adapted for contact with a driving surface during runflat operation and free from contact with the driving surface during operation at normal inflation pressure, each sidewall rib defining an outer contour;
   circumferentially extending first decoupling grooves disposed between each sidewall rib and each adjacent tread rib;
   circumferentially extending second decoupling grooves disposed between the central region of the tread and an adjacent tread rib;
   wherein:
   a circular curve that defines the contour of each respective laterally outermost disposed tread rib and a circular curve that defines the contour of the central region of the tread intersect nontangentially at each respective second decoupling groove; and
   a circular curve defining the contour of a respective radially outermost disposed sidewall rib and a circular curve defining the contour of a respective laterally outermost disposed tread rib intersect nontangentially at each respective circumferentially disposed first decoupling groove.

2. The tire of claim 1 characterized in that at least one of the at least one radial ply is reinforced with inextensible cords.

3. The tire of claim 2 further characterized in that the at least one radial ply that is reinforced with inextensible cords is the outermost of the at least one radial ply.

4. The tire of claim 1 characterized in that the first decoupling grooves between the sidewall ribs and the tread ribs are circumferentially continuous.

5. The tire of claim 1 characterized in that the second decoupling grooves separating the tread ribs from the central region of the tread are circumferentially continuous.

6. The tire of claim 1 characterized in that the first decoupling grooves between the sidewall ribs and the tread ribs are circumferentially discontinuous.

7. The tire of claim 1 characterized in that the second decoupling grooves separating the tread ribs from the central region of the tread are circumferentially continuous and have a zig-zag pattern.

8. A pneumatic radial ply runflat tire having a tread, two inextensible annular beads, a carcass comprising a radial ply structure having at least one radial ply, a belt structure located between the tread and the radial ply structure, and two sidewalls reinforced by one or more inserts, the tire being characterized by:
   a tread having laterally outermost disposed tread ribs, each tread rib defining an outer contour;
   a sidewall rib disposed near a radially outermost region of each sidewall adapted for contact with a driving surface during runflat operation and free from contact with the driving surface during operation at normal inflation pressure, each sidewall rib defining an outer contour;
   circumferentially extending but circumferentially discontinuous first decoupling grooves disposed between each sidewall rib and each adjacent tread rib; and
   circumferentially extending second decoupling grooves disposed between the tread ribs and an adjacent central region of the tread the central region of the tread defining an outer contour.

9. The tire of claim 8 characterized in that at least one of the at least one radial ply is reinforced with inextensible cords.

10. The tire of claim 9 further characterized in that the at least one radial ply that is reinforced with inextensible cords is the outermost of the at least one radial ply.

11. The tire of claim 8 characterized in that the second decoupling grooves separating the tread ribs from the central region of the tread are circumferentially continuous.

12. The tire of claim 8 characterized in that the second decoupling grooves separating the tread ribs from the central region of the tread are circumferentially continuous and have a zig-zag pattern.

13. A pneumatic radial ply runflat tire having a tread, two inextensible annular beads, a carcass comprising a radial ply structure having at least one radial ply, a belt structure located between the tread and the radial ply structure, and two sidewalls reinforced by one or more inserts, the tire being characterized by:

a tread having a central region and adjacent laterally outermost disposed tread ribs; the central region of the tread defining an outer contour, and each tread rib defining an outer contour such that the laterally outermost disposed tread ribs are adapted for full contact with a driving surface during runflat operation but only partial contact with the driving surface during operation at normal inflation pressure;

a sidewall rib disposed near a radially outermost region of each sidewall adapted for contact with the driving surface during runflat operation and free from contact with the driving surface during operation at normal inflation pressure, each sidewall rib defining an outer contour;

circumferentially extending first decoupling grooves disposed between each sidewall rib and each adjacent tread rib;

circumferentially extending second decoupling grooves disposed between the central region of the tread and an adjacent tread rib;

wherein:

a circular curve that defines the contour of each respective laterally outermost disposed tread rib and a circular curve that defines the contour of the central region of the tread intersect nontangentially at each respective second decoupling groove; and a circular curve defining the contour of a respective radially outermost disposed sidewall rib and a circular curve defining the contour of a respective laterally outermost disposed tread rib intersect nontangentially at each respective circumferentially disposed first decoupling groove.

14. The tire of claim 13 characterized in that at least one of the at least one radial ply is reinforced with inextensible cords.

15. The tire of claim 14 further characterized in that the at least one radial ply that is reinforced with inextensible cords is the outermost of the at least one radial ply.

16. The tire of claim 13 characterized in that the first decoupling grooves between the sidewall ribs and the tread ribs are circumferentially continuous.

17. The tire of claim 13 characterized in that the second decoupling grooves separating the tread ribs from the central region of the tread are circumferentially continuous.

18. The tire of claim 13 characterized in that the first decoupling grooves between the sidewall ribs and the tread ribs are circumferentially discontinuous.

19. The tire of claim 13 characterized in that the second decoupling grooves separating the tread ribs from the central region of the tread are circumferentially continuous and have a zig-zag pattern.

* * * * *